Patented May 21, 1929.

1,714,408

UNITED STATES PATENT OFFICE.

FRANCIS GEORGE COAD STEPHENS, LENNOX JAMES ANDERSON, AND WILLIAM ALAN CASH, OF LONDON, ENGLAND, ASSIGNORS TO NATIONAL METAL AND CHEMICAL BANK LIMITED, OF LONDON, ENGLAND.

PRODUCTION OF TITANIUM CONTAINING PIGMENTS.

No Drawing. Application filed March 24, 1927, Serial No. 178,129, and in Great Britain March 26, 1926.

This invention relates to the production of titanium-containing pigments and has for its chief object the manufacture for that purpose of titanium-containing compounds of exceptional whiteness brilliance and covering power.

It is known that when titanium hydrate or oxide is heated to a particular temperature or to a temperature within a certain range it assumes properties that render it very useful as a pigment and it has been proposed to associate other materials with it.

According to the present invention we incorporate boric acid or a borate or material capable of yielding a borate under the conditions of treatment in a titanium-containing pigment consisting essentially of titanic oxide and an alkali earth sulphate. The employment of borates as driers in paint is known but our employment of the same is for a particular purpose and in a particular class of titanium containing pigment, namely, for imparting exceptional whiteness brilliance and covering power to pigments consisting essentially of titanic oxide and an alkali earth sulphate as above stated.

We have found the calcium and barium compounds of boric acid to be particularly suitable. Such materials may be incorporated with the titanic oxide and alkali earth sulphate in proportions varying within wide limits and in a dry or wet state, but preferably in comparatively small proportions for economic reasons and in the wet state for reasons of efficiency of distribution or dissemination within or upon the titanic oxide.

In carrying out the invention according to the preferred mode of procedure we produce or take a suspension in water of hydrated titanium oxide on suspended barium or calcium sulphate. Such a suspension may for example be obtained by treating ground ilmenite with concentrated sulphuric acid, filtering, diluting, adding the necessary quantity of alkaline earth sulphate and boiling to precipitate the titanium as hydrated oxide on the sulphate, again filtering, suspending the residue in water and neutralizing any $SO_3$ remaining in the suspension with a suitable base or a carbonate such as barium or calcium carbonate. It is important that the suspension be slightly alkaline rather than slightly acid and enough base or basic carbonate is therefore added to ensure at least complete neutralization of any acidity. The boric acid or borate, for example calcium or barium borate, in the proportion of say from about 2 to 4 parts by weight to 100 parts $TiO_2$ is then added and intimately mixed or distributed throughout the suspension as by agitation or by boiling or both. We may, if preferred, effect neutralization of acidity after addition of the boric acid or borate instead of before such addition. The resultant solid material or mixture is then separated from the liquid as by filtration and the filtrate is dried and heated to a sufficient temperature, namely from about 700° C. to about 900° C. depending upon the duration of heating, to render it suitable as a pigment.

Although about 2 to 4 parts by weight of the materials hereinbefore specified have been mentioned as suitable, considerably more may be added if desired up to say 60 parts, but 2 to 4 parts are quite sufficient for good results. Also two or more alkali earth sulphates may be used if desired.

What we claim is:—

1. The process of manufacturing a titanium-containing pigment, consisting in mixing intimately titanium oxide, alkaline earth sulphate and a borate and then heating the mixture to a temperature of from about 700° centigrade to about 900° centigrade.

2. The process of manufacturing a titanium-containing pigment, consisting in mixing intimately titanium oxide, alkaline earth sulphate and an alkaline earth borate, and then heating the mixture to a temperature of from about 700° centigrade to about 900° centigrade.

3. The process of manufacturing a titanium-containing pigment, consisting in producing a suspension in water of hydrated titanium oxide on suspended alkaline earth sulphate, intimately mixing therewith a borate, separating the resultant solid material from the liquid, and drying and heating said material to a sufficient temperature to render it suitable as a pigment.

4. The process of manufacturing a titanium-containing pigment, consisting in producing a suspension in water of hydrated titanium oxide on suspended alkaline earth sulphate, completely neutralizing any acidity of the suspension and intimately mixing therewith a borate, separating the resultant solid material from the liquid, and drying and heating said material to a sufficient temperature to render it suitable as a pigment.

5. The process of manufacturing a titanium-containing pigment, consisting in producing a suspension in water of hydrated titanium oxide on suspended alkaline earth sulphate, intimately mixing therewith an alkaline earth borate, separating the resultant solid material from the liquid, and drying and heating said material to a sufficient temperature to render it suitable as a pigment.

6. The process of manufacturing a titanium-containing pigment, consisting in producing a suspension in water of hydrated titanium oxide on suspended alkaline earth sulphate, completely neutralizing any acidity of the suspension and intimately mixing therewith an alkaline earth borate, separating the resultant solid material from the liquid, and drying and heating said material to a sufficient temperature to render it suitable as a pigment.

7. The process of manufacturing a titanium-containing pigment, consisting in producing a suspension in water of hydrated titanium oxide on suspended alkaline earth sulphate, intimately mixing therewith from two to four parts by weight of an alkaline earth borate to each hundred parts of titanic oxide, separating the resultant solid material from the liquid, and drying and heating said material to a sufficient temperature to render it suitable as a pigment.

8. The process of manufacturing a titanium-containing pigment, consisting in producing a suspension in water of hydrated titanium oxide on suspended alkaline earth sulphate, completely neutralizing any acidity of the suspension and intimately mixing therewith an alkaline earth borate in the proportion of about two to four parts by weight to each hundred parts of titanic oxide, separating the resultant solid material from the liquid, and drying and heating said material to a temperature of from about 700° centigrade to about 900° centigrade.

In testimony whereof we have signed our names to this specification.

FRANCIS GEORGE COAD STEPHENS.
LENNOX JAMES ANDERSON.
WILLIAM ALAN CASH.